INVENTOR.
GEORGE H. ACKER
BY
Oberlin + Limbach
ATTORNEYS.

July 10, 1956
G. H. ACKER
2,753,955
FLUID DISTRIBUTING SYSTEM
Filed April 3, 1952
4 Sheets-Sheet 3
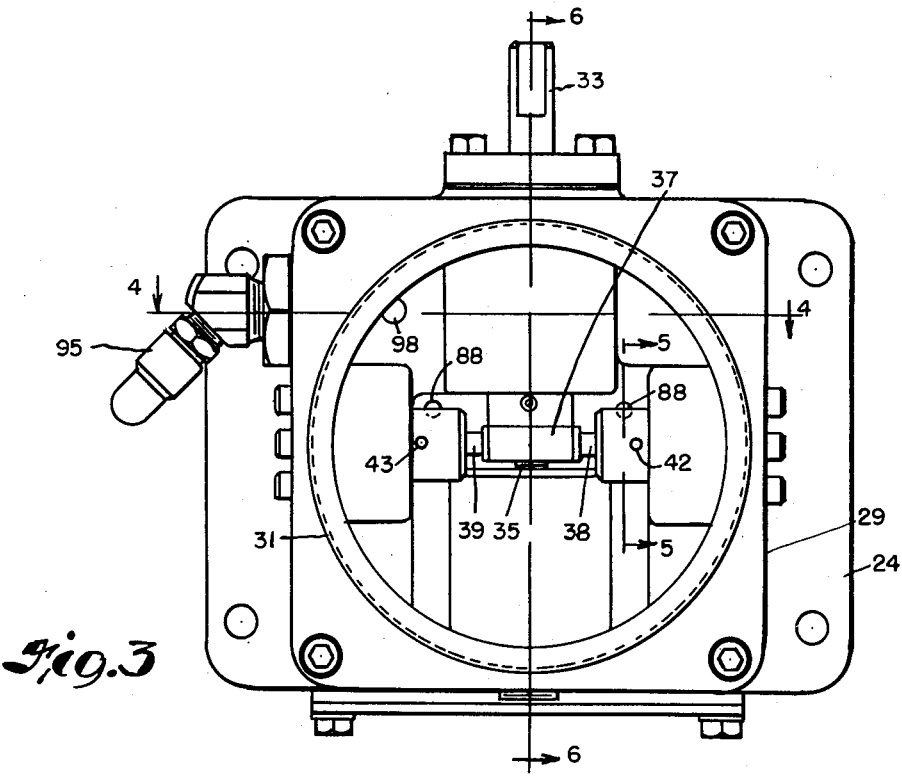
Fig. 3
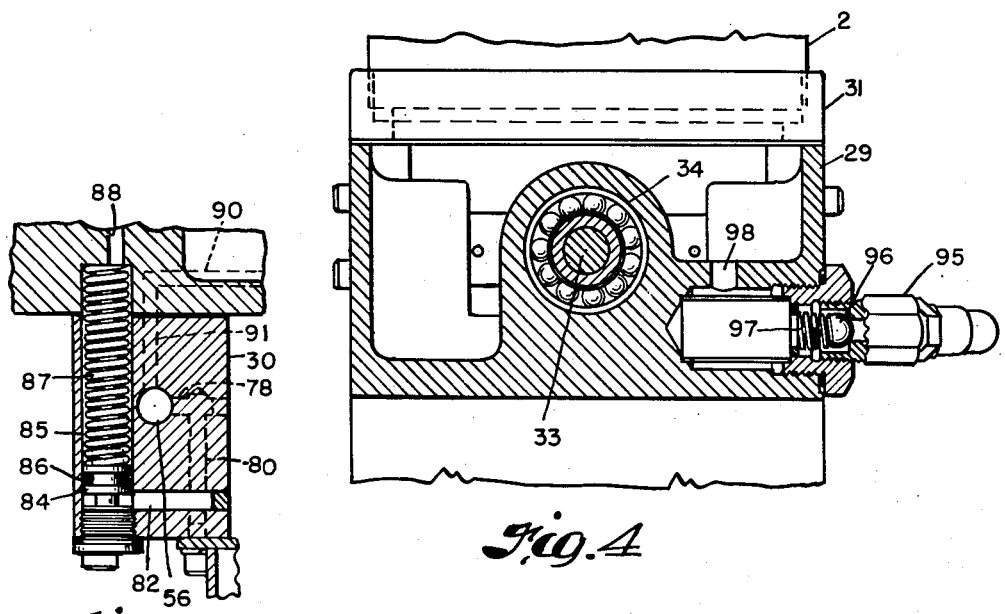
Fig. 5
Fig. 4
INVENTOR.
GEORGE H. ACKER
BY
Oberlin & Limbach
ATTORNEYS.

July 10, 1956
G. H. ACKER
2,753,955
FLUID DISTRIBUTING SYSTEM
Filed April 3, 1952
4 Sheets-Sheet 4
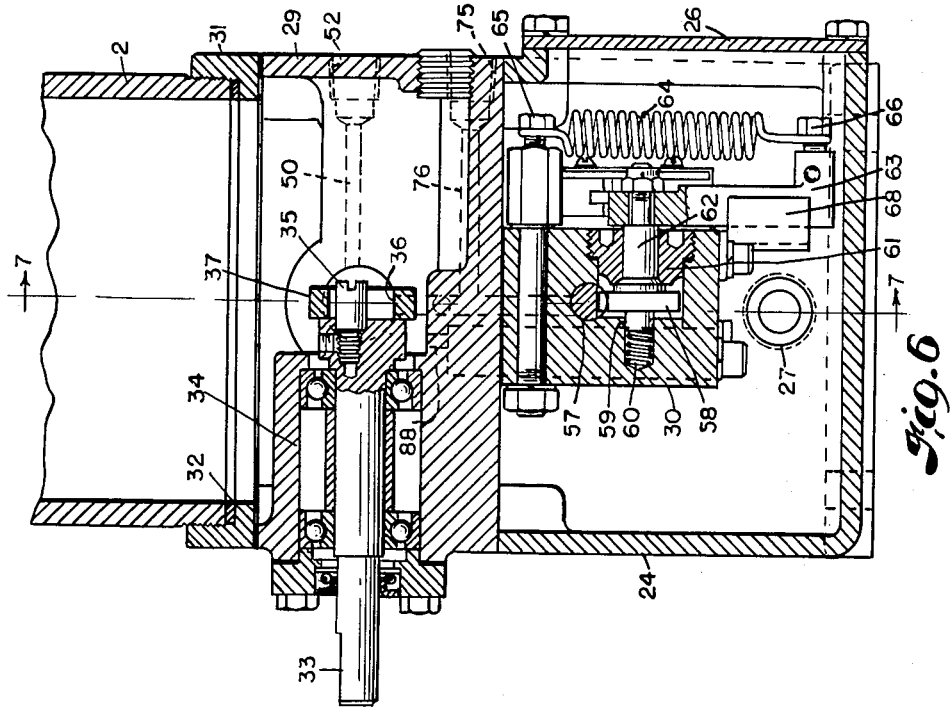
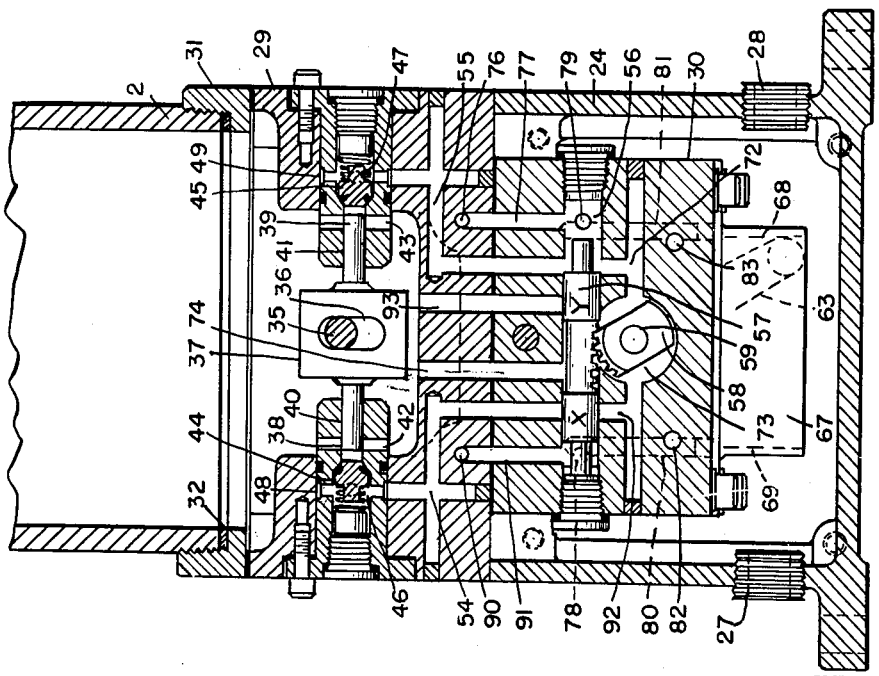
INVENTOR.
GEORGE H. ACKER
BY
Oberlin + Limbach
ATTORNEYS _United States Patent Office_

2,753,955
Patented July 10, 1956

2,753,955

FLUID DISTRIBUTING SYSTEM

George H. Acker, Shaker Heights, Ohio, assignor to The Farval Corporation, Cleveland, Ohio, a corporation of Ohio Application April 3, 1952, Serial No. 280,440

19 Claims. (Cl. 184—7)

This invention relates as indicated to a fluid distributing system, and more particularly to such a system especially adapted automatically to deliver lubricant under pressure to bearings and the like at timed intervals.

In a preferred system of the type hereunder consideration, a plurality of lubricant distributing valves may be located adjacent the bearings, etc., to be lubricated and connected across two parallel fluid pressure lines. Such lines are respectively alternately connected to a source of lubricant under pressure and to relief, the lubricant distributing valves being adapted to be operated by the line pressure to deliver a measured unit charge to the respective bearing or the like. Ordinarily, such lubricant supply means will comprise a reservoir containing oil, grease or like fluid lubricant, a pump adapted to deliver lubricant from such reservoir under pressure, and timer controlled valve means operative thus alternately to connect such lines with such pump delivery. Alternatively, the time cycle may be directly controlled by the operator through manipulation of such valve.

An example of a special measuring valve adapted to be employed in such systems to dispense predetermined amounts of lubricant to a bearing or the like is disclosed in Patent No. 2,016,372 to Aaron J. Jennings. In my co-pending application Serial No. 687,474 entitled "Lubricating Mechanism" filed July 31, 1946, now Patent No. 2,600,178, I disclose a novel pump and control means associated therewith whereby lubricant or other fluid may be thus alternately directed under pressure to such supply lines at selected time intervals. The mechanism disclosed and claimed in such co-pending application is furthermore so designed that the pump may operate continuously even when no fluid is permitted to enter either of such supply lines. In another co-pending application Serial No. 234,636, now Patent No. 2,708,984, entitled, "Hydraulic Reversing Valve," I disclose novel valve means adapted to direct the flow of lubricant from the pressure source alternately to the respective supply lines and means responsive to predetermined pressure in the particular line to which the flow is being thus directed operative to shift such control valve to direct such flow to the other line and connect the line not receiving lubricant to relief. Such application also illustrates one form of "Dualine" system utilizing lubricant dispensing valves of the general type above referred to.

Reference may also be had to my prior Patents Nos. 2,068,391 and 2,068,392 disclosing a certain lubricating system and lubricating pump respectively for supplying lubricant under pressure. It is a principal object of the present invention to provide a simplified and relatively inexpensive automatic system for thus delivering lubricant under pressure to bearings and the like, and more particularly an automatic pumping unit which will be relatively inexpensive of construction and require little maintenance.

Another object is to provide a pumping unit adapted to be driven by a belt drive or the like instead of conventional gearing but without loss of precision and effectiveness.

Still another object is to provide such a pumping unit employing a high speed pump so that very precise fittings and the like are unnecessary, but nevertheless designed to avoid excessive flow.

A further object is to provide a pressure lubricating system wherein the pressure line loop or circuit which carries the lubricant to the lubricant measuring and dispensing valves may be relieved at both ends.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 3 is a top plan view of such unit with the lubricant reservoir removed;

Fig. 4 is a vertical sectional view taken on the line 4—4 on Fig. 3;

Fig. 5 is a vertical sectional detail view taken on the line 5—5 on Fig. 3;

Fig. 6 is a vertical sectional view taken on the line 6—6 on Fig. 3; and

Fig. 7 is a vertical sectional view taken on the line 7—7 on Fig. 6.

Figure 1:
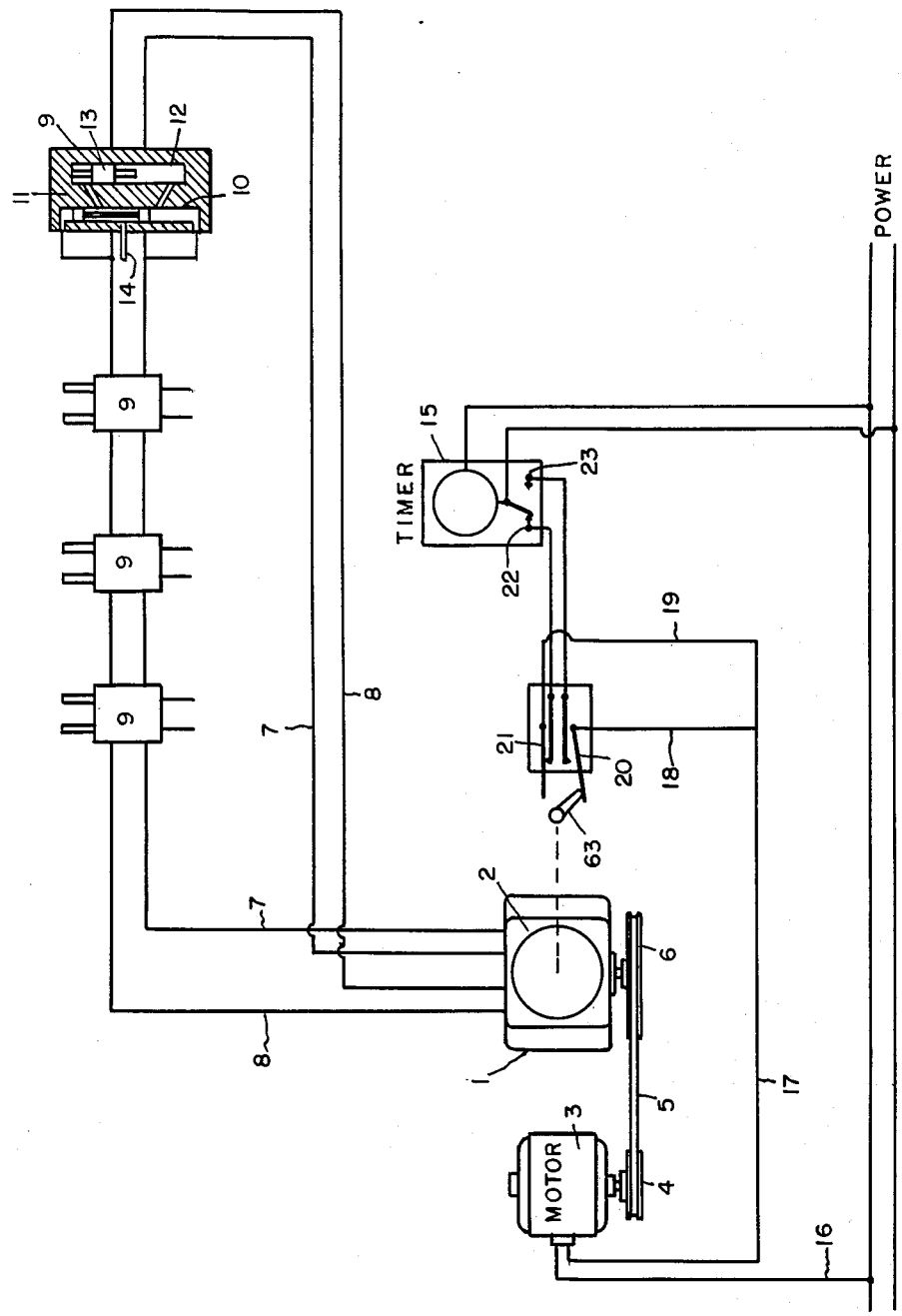
Fig. 1 is a diagrammatic layout of the dual line lubricating system and electrical control circuit therefor embodying the principles of the present invention.

Now referring more particularly to said drawing and especially Fig. 1 thereof, the system there illustrated comprises a pumping unit 1 having a lubricant reservoir 2 connected therewith, the pump being driven by an electric motor 3 through pulley 4, V-belt 5, and pulley 6. Dual line lubricant supply lines or conduits 7 and 8 lead from such pumping unit to the various mechanisms to be lubricated and back to the pumping unit 1. Suitable dual line lubricant measuring and dispensing valves 9 (one of which is schematically illustrated in section) are connected across these lines adapted to deliver a measured charge of lubricant to the bearing or like part to be lubricated whenever one such line is placed under pressure and the other connected to relief. Thus, referring to the valve 9 shown in section, when line 7 is placed under pressure, lubricant will enter shifting valve cylinder 10 to reciprocate valve member 11 to the position shown and admit lubricant to the lower end (in Fig. 1) of measuring valve cylinder 12, reciprocating piston 13 therein to expel a measured charge of lubricant through outlet port 14. It will be understood that this particular form of valve is here described for purposes of illustration only and does not itself constitute a part of this invention, being old in the art. Various other forms of measuring and dispensing valves may be utilized, as desired, which are similarly operated from a dual line system.

Electric motor 3 may, for example, be a single phase quarter horsepower 1750 R. P. M. motor arranged to drive pulley 6 at aproximately 600 R. P. M. A timer in the form of time clock 15, commonly available, that will make and hold single pole contacts alternately on each of two electric circuits at equally spaced but adjustable timed intervals may desirably be employed. With one motor lead 16 connected to the power circuit directly and the other motor lead 17 connected to the power circuit through two parallel lines 18 and 19, each including one of the two normally closed micro-switches (limit switches) 20 and 21 (see also Fig. 2) and one of the time clock contacts 22 and 23 in series, in a manner conventional for an electrical hook-up for two-station operation, the time clock 15 will initiate operation of the system and when the hydraulic pressure requirements of the lubricating system have been met the control unit acting through the electrical limit switches in a manner described in detail below will shut the system down. Of course, instead of the timer 15, other means may be utilized to control the system. Thus, if a double-throw, single pole manual push button station be substituted for such time clock, the operation of the system may be manually controlled at any desired frequency of operation. Moreover, the V-belt drive 5 may be taken from some rotating shaft or part on the machine to be lubricated and a magnetic clutch-coupling employed to secure the V-belt pulley 6 to its driven shaft. A timing device driven from such machine may be employed in lieu of the electric time clock 15 alternately to energize the two electric circuits to actuate such clutch-coupling.

Referring now more particularly to Figs. 2-7 inclusive showing the pumping unit 1 and reservoir 2, such unit comprises a base frame 24 adapted to be bolted to a mounting surface and providing a lubricant-free compartment within which the electrical connections to the micro-switches 20 and 21 may be made. A suitable access opening 25 is adapted to be closed by means of closure plate 26, and threaded conduit connections 27 and 28 afford entrance for the electric wiring (not shown) leading to such switches. A pump housing 29 is mounted on base member 24 to the underside of which the control valve block 30 is attached and on the upper side of which the reservoir adapter 31 is mounted. Cylindrical reservoir 2, of conventional type, is screwed down into such adapter as shown in Figs. 6 and 7, seated on a lead gasket ring 32 to make a leak-proof joint.

The pump drive shaft 33 is journalled in ball bearings in a suitable bore 34 in the pump housing 29, the inner end of such pump shaft terminating in an enlarged section drilled and threaded to receive an eccentrically located pump driving stud 35 and its securing set screw. The projecting cylindrical head of this eccentric pump driving stud 35 engages in a vertical slot 36 in the central head 37 of the double-acting pump piston to form a "Scotch yoke" driving linkage, the respective ends 38 and 39 of such piston being fitted for reciprocation in cylinders 40 and 41.

Referring particularly to Fig. 7, it will be seen that the piston is there illustrated in mid stroke and if it travels in either direction, it will uncover inlet ports 42 or 43 which connect with the lubricant filled reservoir cavity, permitting lubricant to enter one or the other of the pump cylinders. On the return stroke of the piston, the last-opened inlet port will be closed off and the piston will then exert pressure on the lubricant entrapped in the cylinder, forcing such lubricant to open the respective discharge check valve 44 or 45 against the resistance of the springs backing the same. At the same time the withdrawal of the other piston end from the end of its respective cylinder acts to create a vacuum in the latter until its inlet port opening is uncovered, when lubricant thereupon enters such cylinder to fill the void. In this manner, lubricant is forced into the respective valve chambers 46 and 47, and its return to the pump cylinders is prevented by such check valve pistons 44 and 45 preferably furnished with composition sealing rings.

Figure 2:
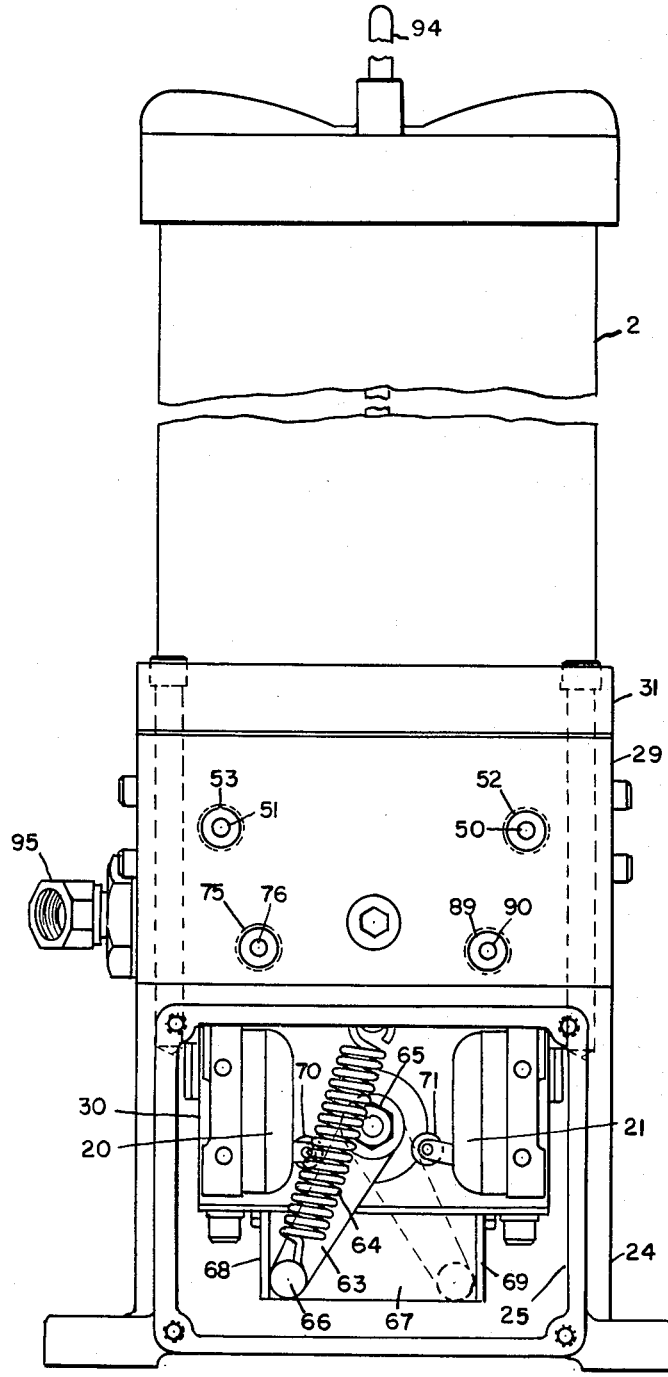
Fig. 2 is an elevational view of my novel pumping unit.

Such chambers 46 and 47 have annular respective passages 48 and 49 connected therewith by cross drilled ports, and themselves connect with lateral passages 50 and 51 leading to the discharge line connections 52 and 53 (see Fig. 2). Thus, each of the valve chambers 46 and 47 is permanently connected to a respective outgoing lubricant supply line 7 and 8. Passages 54 and 55 lead from the respective chambers 46 and 47 to a cylinder 56 in control valve body 30 which is bolted and gasketed to the underside of the pump housing 29.

Control piston 57 is mounted for reciprocation in cylinder 56 and is provided with a reduced center portion between shoulders X and Y having rack teeth cut therein adapted to mesh with pinion teeth cut in the end of the control sector member 58 so that longitudinal reciprocation of such piston requires a corresponding rocking action of such control segment about its pivot 59.

A compression spring 60 bearing against such pivot forces a beveled face on segment 58 against the complementary beveled face of the bushing 61 to form a sealing face. A shaft 62 extending from segment 58 is journalled in bushing 61 and carries a crank arm 63 secured to its outer end. Such end of shaft 62 may form a squared arbor to which such crank arm is thus fitted and secured by means of a nut. A generally vertically extending tension spring 64 is secured at its upper end to a stud 65 vertically above the axis of shaft 62 and at its lower end to the stud 66 on the end of arm 63. A depending bracket 67 is formed with two projecting end flanges 68 and 69 to limit rocking movement of crank arm 63 and hence of segment 58. Spring 64, of course, affords a type of toggle action, holding arm 63 against one or the other of the end flanges 68 and 69, in which position the crank arm 63 will engage and depress one or the other of the actuating levers 70 and 71 of microswitches 20 and 21 respectively (see Fig. 2). Such switches have normally closed contacts so that when such a switch actuating lever is depressed, the corresponding switch contact will be broken.

Now again referring to Fig. 7, it will be seen that piston 57 is there shown in its extreme left-hand position and is so held through the above-described mechanical linkage by action of spring 64. In such position, the control piston closes off passage 54 leading to cylinder 56 since one of the two fitted shoulders on such piston lies directly across the intersection of such passage with the cylinder. The passage 55, however, communicates with the right-hand end of cylinder 56 when piston 57 is in its left-hand position and thence through passage 72 to the cavity 73 in which segment 58 is located, around the reduced center portion of piston 57 and through passage 74 to the lubricant reservoir, the latter being at atmospheric pressure. In consequence, although supply line 7 is permanently connected with pump pressure chamber 47 through passage 51, the lubricant pumped into chamber 47 is provided with a relatively free and short passage back to the reservoir and only a very nominal pressure rise will be obtained in chamber 47 when piston 57 is in the position shown.

It will also be noted that the return end 75 of the supply line loop 7 is provided with similar pressure relief through passages 76 and 77 likewise in communication with the right-hand end of cylinder 56, so that such supply line is relieved of pressure at both ends. When handling grease lubricants particularly, this is a rather important detail as the resistance to flow of such lubricants in the supply lines results in a residual back pressure or entrapped pressure in such lines directly proportional to the distance from the point of relief. Therefore, by relieving pressure at both ends of the supply line loop, the permissible length of such loop may be doubled for any given line diameter.

Passages 78 and 79 lead from the respective ends of cylinder 56 to corresponding vertically extending passages 80 and 81 which in turn communicate with corresponding horizontally extending passages 82 and 83 communicating with the lower ends of respective accumulator cylinders (Fig. 5). As such accumulators are exactly alike, only one will be described in detail. A piston 84 is mounted for reciprocation in vertical cylinder 85 in block 30. Sealing ring 86 serves to prevent any significant escape of lubricant to the reservoir from below piston 84 so that lubricant under pressure reaching the underside of such piston will cause the latter to move upwardly against the force of spring 87. Passage 88 leads from the upper end of such cylinder 85 to the reservoir so that there can be no entrapment of lubricant in such cylinder above the piston.

Since in the position shown piston 57 closes off passage 54, lubricant pumped into the valve chamber 46 is forced through the annular passage 48 to passage 50 and supply line 8 connected therewith. The return from line 8 is connected at 89 to passage 90 and vertically extending passage 91 which communicates with the left-hand end of cylinder 56 and thence through passage 78, passage 80, the passage 82 with the lower end of a corresponding accumulator cylinder 85. As lubricant is forced into supply line 8 from passage 50, the pressure in such line, and eventually also in the left-hand end of cylinder 56 and the lower end of cylinder 85, rises until it becomes great enough to operate the interconnected lubricating valves 9 and to force piston 84 upwardly against the resistance of spring 87 until such latter spring has been fully compressed. When these operations have been completed, lack of any additional outlet for the lubricant causes the pressure in line 8 to rise still higher. This pressure eventually reaches a level where it is effective on the end area of piston 57, producing a force against such piston opposing that exerted by spring 64, and when such pressure approaches 700 to 800 pounds per square inch, for example, the force will exceed that of the spring operating to hold arm 63 in one extreme position, and will cause piston 57 to move to the right with the interconnected crank arm 63 swinging towards its mid position. This, of course, acts further to stretch the spring 64, but it will be noted that the moment arm of this spring about the axis of the arm 63 decreases so rapidly with movement of the crank toward mid position that the force required thus to move piston 57 is most at the start of such movement. As piston 57 approaches its mid position, it closes off passages 72, 55, preventing the free return of lubricant from check valve chamber 47 to the reservoir. The pressure in supply line 7 thereupon starts to rise due not only to the lubricant forced into it from such valve chamber 47 but also to the displacement of lubricant from the right-hand end of cylinder 56 as piston 57 shifts to the right. Such pressure rise is limited to a relatively low magnitude momentarily by the action of spring-backed piston 84 in the other accumulator cylinder 85 communicating with passage 83 travelling upwardly and absorbing the displacement of piston 57 and of the pump. The displacement thus absorbed by the movement of piston 84 in such latter cylinder 85 must be somewhat more than twice that of piston 57 after passage 72 has been closed off since it must thereafter absorb the remaining displacement of piston 57 and a substantially equal displacement of the right-hand pump element 39.

Because the pressure rise in the right-hand end of cylinder 56 is thus limited, piston 57 will continue to move to the right after the closing of passage 72 and the crank arm 63 will pass dead-center so that spring 64 now assists rather than retards the further shifting of piston 57. The left-hand end of piston 57 then uncovers passage 92, thereby connecting supply line 8 to the reservoir through passages 90, 91, the left-hand end of cylinder 56, passage 92, chamber 73, and passage 93. Pressure in chamber 46 is similarly relieved through passage 54. Shifting of piston 57 to the right is checked when the end of crank arm 63 engages stop 69.

When arm 63 started its leftward swing (as viewed in Fig. 7), it released limit switch actuating arm 70, permitting switch 20 to close. The time clock contact 23 in series with this switch 20 is open, however (Fig. 1). As the crank arm completes its leftward swing, it now engages switch actuating arm 71 to open limit switch 21, thus opening the motor energizing circuit and stopping all operation except the normal movement of the time clock or equivalent timing device 15. It will accordingly be seen that the lubricating system is stopped with the supply line that has just been subjected to peak pressure relieved of pressure and before the other suply line has been subjected to any high pressure. The lubricating system therefore pauses under nominal pressure until the time clock opens the last made control circuit contact 22 and closes the alternate contact 23, causing motor 3 again to be energized to drive the pump and producing a cycle of operation placing operating pressure on supply line 7, again operating lubricant dispensing valves 9, and again terminating with the return of the pump and control unit to their initial condition.

In the light of the foregoing, it will be seen that I provide what are really two separate pumps although both are driven by a single operating element and only one of such pumps is truly effective at any time. Such pumps may be driven at a high rate of speed and are therefore quite efficient for my purpose despite the relatively short pumping strokes. But a single valve piston 57 is required and the cylinder containing the same has a relatively short bore, considerably reducing the cost of my novel assembly in contrast to prior art devices intended to serve a generally similar purpose. The advantage of providing means for relieving both ends of a pressure line loop when not employing the same to deliver lubricant under pressure to the dispensing valves has been pointed out above. The two simultaneously operating pumps permit efficient high speed operation without obtaining too much flow since only one such pump is permitted to deliver lubricant to a pressure line. Need for expensive special reversing valves, ordinarily required, is likewise avoided. The pressure accumulators (cylinders 85), one for each pressure line, could be connected anywhere in the respective circuits but they will preferably be located at or near the return ends of such respective circuits, as shown.

While, as above indicated, the employment of a timer is optional and the mechanism may be manually or otherwise controlled, the employment of such timer is of course much preferred. The limit switches 20 and 21 should be operated in timed relation to the operation of the flow shifter valve (and ordinarily by it) to stop the pump motor drive. Numerous embodiments of my invention will be apparent to those skilled in the art, as for example the provision of protruding indicator stems on the ends of piston 57, visually to show operation of the mechanism. Moreover, such protruding stems could be employed to actuate the limit switches 20 and 21 instead of utilizing crank arm 63 for such purpose. In fact, the cycle might, if desired, be stopped by causing operation of any one of the dispensing valves 9 thus to actuate the limit switch. It is more practical, however, to terminate a lubricating cycle after all such dispensing valves on a particular circuit have been operated.

When the level of lubricant in the reservoir has been considerably reduced as indicated by the position of the usual indicator stem 94, additional lubricant may be introduced to the reservoir under pressure through filler plug 95 (Figs. 3 and 4). Such filler plug is provided with a ball check valve 96 backed by a spring 97 and communicates with the lower end of the reservoir through passage 98.

Other modes of applying the principle of the invention may be employed, change being made as regards the details described, provided the features stated in any of the following claims or the equivalent of such be employed.

I therefore particularly point out and distinctly claim as my invention:

1. In a lubricant dispensing system having two lubricant supply conduits, lubricant dispensing valves connected across such conduits and operative to dispense a measured charge of lubricant when either such conduit is placed under pressure and the other connected to relief, a lubricant reservoir, a pump connected with such reservoir adapted to deliver lubricant under pressure to such respective conduits, and drive means for such pump; flow control means for such system comprising an electrical control circuit for such pump drive means, two normally-closed limit switches in parallel in said circuit, timing means including two contacts respectively in series with said switches; a control valve comprising a cylinder, a piston reciprocable in said cylinder provided with two symmetrically spaced shoulders slidingly fitted therein, such pump comprising a double-ended piston the respective ends of which are mounted for reciprocation in respective pump cylinders, lubricant passages leading from the respective delivery ends of such pump cylinders and connected to said valve cylinder at points spaced from the respective ends thereof, two passages leading from such reservoir to said valve cylinder and communicating with the latter adjacent the mid-point thereof, said shoulders of said valve piston being spaced to ensure that at least one of said latter passages will at all times communicate with the region afforded by the reduced section of said valve piston intermediate said shoulders, a pivotally mounted gear segment having teeth engaging corresponding rack teeth on the mid-portion of said valve piston for oscillation of said segment with reciprocation of said latter piston, an arm mounted for oscillation with said segment, spring means connected to said arm adapted to impart a toggle snap action thereto when said valve piston is reciprocated past center, stop means adapted to limit such oscillation of said arm in each direction, said limit switches being respectively positioned for engagement and actuation by said arm at the extreme limits of the latter's oscillation to open the same, whereby an electric circuit to energize such pump drive means can only be made when a said limit switch and a said timing means contact in series therewith are simultaneously closed, lubricant passages leading from the respective ends of said valve cylinder to ends of such respective conduits, a chamber in which said segment is adapted to oscillate and which is in communication with such region in said valve cylinder afforded by the reduced section of said valve piston intermediate said shoulders so as to communicate at all times with at least one of said passages leading from said valve cylinder to such reservoir, passages leading to said chamber from said valve cylinder in the respective regions of said first passages leading from such pump cylinders to said valve cylinder, passages leading from the respective delivery ends of such pump cylinders directly to the other ends of such conduits and in communication therewith at all times, and two fluid pressure accumulators comprising cylinders having spring-backed pistons therein, passages leading from the ends of said valve cylinder respectively to said accumulators, whereby, when such pump is operating, lubricant will be forced directly into one such conduit while the other such conduit is connected to reservoir through said valve, thereby operating such lubricant dispensing valves and building up pressure in the end of said control valve cylinder toward which said control valve piston is displaced, such pressure becoming effective to shift said control valve piston toward the other end of said control valve cylinder and thereby oscillate said arm to release one said limit switch and engage and open the other said limit switch, thereby breaking the control circuit until said timing means operates to close the said contact in series with said limit switch thus released, such shift of said control valve piston likewise now placing the conduit under pressure in communication with the reservoir and cutting off the other such conduit from the reservoir preparatory to initiation of another operating cycle.

2. In a lubricant dispensing system having two lubricant supply conduits, lubricant dispensing valves connected across such conduits and operative to dispense a measured charge of lubricant when either such conduit is placed under pressure and the other connected to relief, a lubricant reservoir, two pumps connected with such reservoir respectively adapted to deliver lubricant under pressure to an end of each such conduit, and common electric motor drive means for such pumps; flow control means for such system comprising an electrical control circuit for such motor, two normally-closed limit switches in parallel in said circuit, timing means including two contacts respectively in series with said switches; a control valve comprising a cylinder, a piston reciprocable in said cylinder provided with two symmetrically spaced shoulders slidingly fitted therein, each pump including a piston mounted for reciprocation in a respective pump cylinder, lubricant passages leading from the respective delivery ends of such pump cylinders and connected to said valve cylinder at points spaced from the respective ends thereof, passage means adapted to maintain communication at all times between such reservoir and said valve cylinder in the region intermediate said piston shoulders, a pivotally mounted gear segment having teeth engaging corresponding rack teeth on the mid-portion of said valve piston for oscillation of said segment with reciprocation of said latter piston, an arm mounted for oscillation with said segment, spring means connected to said arm adapted to impart a snap action thereto when said valve piston is reciprocated to overbalance the force of said spring means by moving said arm past dead center, stop means adapted to limit each oscillation of said arm in each direction, said limit switches being respectively positioned for engagement and actuation by said arm at the extreme limits of the latter's oscillation to open the same, whereby an electric circuit to energize such pump drive means can only be made when a said limit switch and a said timing means contact in series therewith are simultaneously closed, lubricant passages leading from the respective ends of said valve cylinder to the return ends of such respective conduits, a chamber in which said segment is adapted to oscillate and which is in communication with such region in said valve cylinder afforded by the reduced section of said valve piston intermediate said shoulders so as to communicate at all times with said passage means connecting such region with such reservoir, passages leading to said chamber from said valve cylinder in the respective regions of said first passages leading from such pump cylinders to said valve cylinder, passages leading from the respective delivery ends of such pump cylinders directly to the other ends of such conduits and in communication therewith at all times, and two fluid pressure accumulators comprising cylinders having spring-backed pistons therein, passages leading from the ends of said valve cylinder respectively to said accumulators, whereby, when such pump is operating, lubricant will be forced directly into one such conduit while the other such conduit is connected to reservoir through said valve, thereby operating such lubricant dispensing valves and building up pressure in the end of said control valve cylinder toward which said control valve piston is displaced, such pressure becoming effective to shift said control valve piston toward the other end of said control valve cylinder and thereby oscillate said arm to release one said limit switch and engage and open the other said limit switch, thereby breaking the control circuit until said timing means operates to close the said contact in series with said limit switch thus released, such shift of said control valve piston likewise now placing the conduit under pressure in communication with the reservoir and cutting off the other such conduit from the reservoir preparatory to initiation of another operating cycle.

3. In a fluid dispensing system having two supply conduits, and fluid dispensing valves connected across such conduits operative to dispense a measured charge of fluid when either such conduit is placed under pressure and the other connected to relief; two pumps, common drive means for said pumps operative to drive the same simultaneously, valve means adapted to connect the respective pump deliveries alternately to relief, means connecting such pump deliveries at all times to an end of a respective conduit, and means adapted to be actuated by pressure in the other ends of said conduits operative to shift said valve means to connect the other such pump delivery to relief.

4. In a fluid dispensing system having two supply conduits, and fluid dispensing valves connected across such conduits operative to dispense a measured charge of fluid when either such conduit is placed under pressure and the other connected to relief; two aligned piston-cylinder pumps, common drive means for said pumps operative to drive the same simultaneously with the force and intake strokes of said pumps alternating, valve means adapted to connect the respective pump deliveries alternately to relief, means connecting such pump deliveries at all times to an end of a respective conduit, whereby connection of the delivery of one said pump to relief is likewise effective to connect an end of a corresponding conduit to relief, said valve means also being operative to connect the other end of such relieved conduit to relief, and pressure accumulators respectively connected to each such conduit, said valve being shiftable by fluid pressure in the other end of such conduit receiving delivery from one said pump to connect the other said pump to relief and disconnect the other end of such formerly relieved conduit from relief while connecting the other end of such conduit formerly under pressure to relief.

5. In a fluid dispensing system having two supply conduits, and fluid dispensing valves connected across such conduits operative to dispense a measured charge of fluid when either such conduit is placed under pressure and the other connected to relief; two pumps, valve means adapted to connect the respective pump deliveries alternately to relief, means connecting such pump deliveries at all times to an end of a respective conduit, whereby connection of the delivery of one said pump to relief is likewise effective to connect an end of a corresponding conduit to relief, said valve means also being operative to connect the other end of such relieved conduit to relief, and pressure accumulators respectively connected to each such conduit, said valve being shiftable by fluid pressure in the other end of such conduit receiving delivery from one said pump to connect the other said pump to relief and disconnect the other end of such formerly relieved conduit from relief while connecting the other end of such conduit formerly under pressure to relief.

6. In a fluid dispensing system having two supply conduits, and fluid dispensing valves connected across such conduits operative to dispense a measured charge of fluid when either such conduit is placed under pressure and the other connected to relief; pump means connected to one end of each such conduit at all times, valve means adapted alternately to bleed to relief the pump means delivery to one such conduit only to prevent the building up of substantial pressure in such latter conduit, valve means adapted simultaneously to connect the other end of such latter conduit to relief, and control means adapted to reverse both said valve means to disconnect such latter conduit from relief and connect the other such conduit to relief.

7. In a fluid dispensing system having two supply conduits, and fluid dispensing valves connected across such conduits operative to dispense a measured charge of fluid when either such conduit is placed under pressure and the other connected to relief; pump means connected to one end of each such conduit at all times, valve means operative alternately to bleed to relief the pump means delivery to one such conduit only to prevent building up of substantial pressure in such latter conduit, valve means shiftable with said first valve means operative simultaneously to connect the other end of such latter conduit to relief, pressure-responsive means actuated by pressure build-up in the conduit not thus connected to relief operative to shift said valve means to disconnect such one conduit from relief and connect the other such conduit to relief, and pressure accumulators connected to each such conduit respectively.

8. In a fluid dispensing system having two supply conduits, and fluid dispensing valves connected across such conduits operative to dispense a measured charge of fluid when either such conduit is placed under pressure and the other connected to relief; pump means connected to one end of each such conduit at all times, piston valve means including a cylinder and a piston shiftable therein alternately to bleed to relief the pump means delivery directed to one such conduit only, said piston valve means being operative when thus shifted also to connect the other end of such conduit to relief, and when shifted in the other direction to close such connections and connect the other such conduit to relief in the same manner, and means connecting the respective ends of said cylinder to the return ends of such respective conduits whereby pressure build-up in one such conduit is effective to shift said piston to reverse such connections to relief.

9. In a fluid dispensing system having two supply conduits, and fluid dispensing valves connected across such conduits operative to dispense a measured charge of fluid when either such conduit is placed under pressure and the other connected to relief; pump means connected to one end of each such conduit at all times, piston valve means including a cylinder and a piston shiftable therein alternately to bleed to relief the pump means delivery directed to one such conduit only, said piston valve means being operative when thus shifted also to connect the other end of such conduit to relief, and when shifted in the other direction to close such connections and connect the other such conduit to relief in the same manner, means connecting the respective ends of said cylinder to the return ends of such respective conduits whereby pressure build-up in one such conduit is effective to shift said piston to reverse such connections to relief, and means connected with said piston adapted to resist such shifting thereof until overbalanced.

10. In a fluid dispensing system having two supply conduits, and fluid dispensing valves connected across such conduits operative to dispense a measured charge of fluid when either such conduit is placed under pressure and the other connected to relief; pump means connected to one end of each such conduit at all times, piston valve means including a cylinder and a piston shiftable therein alternately to bleed to relief the pump means delivery directed to one such conduit only, said piston valve means being operative when thus shifted also to connect the other end of such conduit to relief, and when shifted in the other direction to close such connections and connect the other such conduit to relief in the same manner, means connecting the respective ends of said cylinder to the return ends of such respective conduits whereby pressure build-up in one such conduit is effective to shift said piston to reverse such connections to relief, means connected with said piston adapted to resist such shifting thereof until overbalanced, and expansible fluid accumulators connected to each such conduit.

11. In a fluid pressure system having two separate conduits adapted to receive fluid under pressure, a fluid pressure operated dispensing valve connected across said two conduits and operative to dispense fluid therefrom when said conduits are alternately pressurized and relieved, two pumps adapted respectively to deliver fluid under pressure to an inlet end of a corresponding such conduit, and common drive means for such pumps; valve means operative alternately to bleed the discharge of one such pump to relief, and valve means operative substantially simultaneously to connect the other end of such conduit corresponding to such one pump also to relief.

12. In a fluid pressure system having two separate conduits adapted to receive fluid under pressure, a fluid pressure operated dispensing valve connected across said two conduits and operative to dispense fluid therefrom when said conduits are alternately pressurized and relieved, and two pumps adapted respectively to deliver fluid under pressure to an inlet end of a corresponding such conduit; valve means operative alternately to bleed the discharge of one such pump to relief and means operative substantially simultaneously to connect to relief a return end of the same conduit thus deprived of pump discharge pressure.

13. In a fluid dispensing system including two conduits, and a fluid dispensing device adapted to be operated by alternately placing one such conduit under pressure and relieving the other such conduit; two pumps adapted respectively to deliver fluid under pressure to a corresponding such conduit, common drive means for said pumps operative to drive the latter simultaneously, valve means operative to connect each pump delivery alternately to relief, and valve reversing means adapted to be actuated by pressure build-up in such conduit connected to that pump not then discharging to relief.

14. In a fluid dispensing system including two conduits, and a fluid dispensing device adapted to be operated by alternately placing one such conduit under pressure and relieving the other such conduit; two pumps adapted respectively to deliver fluid under pressure each to an inlet end of a corresponding such conduit, common drive means for said pumps operative to drive the latter simultaneously, and control means operative simultaneously to connect both ends of one such conduit to relief, said control means being operative to perform such function alternately with regard to first one such conduit and then the other.

15. In a fluid dispensing system including two conduits, and a fluid dispensing device adapted to be operated by alternately placing one such conduit under pressure and relieving the other such conduit; two pumps adapted respectively to deliver fluid under pressure to a corresponding such conduit, common drive means for said pumps operative to drive the latter simultaneously, and control means operative alternately to connect both ends of each such conduit to relief.

16. In a lubricant dispensing system including two conduits and dispensing means adapted to be actuated by placing such conduits alternately under pressure; pump means operative to deliver lubricant under pressure to such conduits, drive means for said pump means, an electric circuit controlling energization of said drive means, contacts in parallel in said circuit, a timer automatically operative to open and close said respective contacts alternately at predetermined timed intervals, a control valve shiftable in one direction to connect one such conduit to relief and in the other direction to connect the other such conduit to relief in response to build-up of fluid pressure in the line not then connected to relief, two additional contacts likewise in parallel in said circuit, and means operative to open and close said respective latter contacts alternately in timed relation to such shifting of said valve.

17. In a lubricant dispensing system including two conduits and dispensing means adapted to be actuated by placing such conduits alternately under pressure; pump means operative to deliver lubricant under pressure to such conduits, drive means for said pump means, an electric circuit controlling energization of said drive means, contacts in parallel in said circuit, a timer automatically operative to open and close said respective contacts alternately at predetermined timed intervals, a control valve shiftable in one direction to place one such conduit under pressure from such pump delivery and in the other direction to place the other such conduit under pressure, means operative thus to shift said valve actuated by substantial fluid pressure in the conduit then pressurized, a pressure accumulator connected to each such conduit, two additional contacts likewise in parallel in said circuit, and means operative to open and close said respective latter contacts alternately in timed relation to such shifting of said valve.

18. In a fluid dispensing system having two supply conduits, and fluid dispensing valves connected across such conduits operative to dispense a measured charge of fluid when either such conduit is placed under pressure and the other connected to relief; pump means connected to one end of each such conduit at all times, valve means operative alternately to bleed to relief the pump means delivery to one such conduit only to prevent building up of substantial pressure in such latter conduit, valve means shiftable with said first valve means operative simultaneously to connect the other end of such latter conduit to relief, pressure-responsive means actuated by pressure build-up in the conduit not thus connected to relief operative to shift said valve means to disconnect such one conduit from relief and connect the other such conduit to relief, means adapted to resist initial shifting of said valve means in each direction, and pressure accumulators connected to each such conduit respectively.

19. In a fluid dispensing system having two supply conduits, and fluid dispensing valves connected across such conduits operative to dispense a measured charge of fluid when either such conduit is placed under pressure and the other connected to relief; pump means connected to one end of each such conduit at all times, piston valve means including a single cylinder and a single piston shiftable therein alternately to bleed to relief the pump means delivery directed to one such conduit only, said piston valve means being operative when thus shifted also to connect the other end of such conduit to relief, and when shifted in the other direction to close such connections and connect the other such conduit to relief in the same manner, means connecting the respective ends of said cylinder to the return ends of such respective conduits whereby pressure build-up in one such conduit is effective to shift said piston to reverse such connections to relief, means connected with said piston adapted to resist such shifting thereof until overbalance, and a resiliently expansible fluid accumulator connected to each such conduit.

References Cited in the file of this patent

UNITED STATES PATENTS

| 1,432,041 | Scott | Oct. 17, 1922 |
| 1,681,588 | Lawson | Aug. 21, 1928 |
| 1,743,005 | Resler | Jan. 7, 1930 |
| 1,950,158 | Barks | Mar. 6, 1934 |
| 2,038,287 | Hawks | Apr. 21, 1936 |
| 2,345,082 | Waseige | Mar. 28, 1944 |
| 2,505,271 | Bevins | Apr. 25, 1950 |
| 2,561,786 | Davis | July 24, 1951 |